United States Patent
Guilloux et al.

(10) Patent No.: US 7,731,359 B2
(45) Date of Patent: Jun. 8, 2010

(54) METHOD FOR THE DETERMINATION OF A PROGRESSIVE OPHTHALMIC LENS

(75) Inventors: Cyril Guilloux, Paris (FR); Diane De Gaudemaris, Paris (FR); Céline Carimalo, Singapore (SG)

(73) Assignee: Essilor International (Compagnie d'Optique), Cedex (FR)

( * ) Notice: Subject to any disclaimer, the term of this patent is extended or adjusted under 35 U.S.C. 154(b) by 330 days.

(21) Appl. No.: 11/679,395

(22) Filed: Feb. 27, 2007

(65) Prior Publication Data

US 2007/0242221 A1    Oct. 18, 2007

(30) Foreign Application Priority Data

Mar. 1, 2006    (FR) ................... 06 01811

(51) Int. Cl.
*G02C 7/02*    (2006.01)

(52) U.S. Cl. ........................ 351/177; 351/159

(58) Field of Classification Search ............. 351/159, 351/177

See application file for complete search history.

(56) References Cited

U.S. PATENT DOCUMENTS

| | | | |
|---|---|---|---|
| 5,270,745 | A | 12/1993 | Pedrono |
| 5,272,495 | A | 12/1993 | Pedrono |
| 5,333,412 | A | 8/1994 | Matsuyama |
| 5,444,503 | A | 8/1995 | Kelch et al. |
| 5,488,442 | A | 1/1996 | Harsigny et al. |
| 6,199,983 | B1 | 3/2001 | Kato et al. |
| 6,318,859 | B1 * | 11/2001 | Baudart et al. ............. 351/169 |
| 6,382,789 | B1 | 5/2002 | Baudart et al. |
| 6,595,637 | B2 | 7/2003 | Ahsbahs et al. |
| 6,655,802 | B2 | 12/2003 | Zimmermann et al. |
| 6,682,194 | B2 | 1/2004 | Ahsbahs et al. |
| 2004/0169297 | A1 | 9/2004 | Dorsch |
| 2007/0103641 | A1 | 5/2007 | Bonnin |
| 2007/0121063 | A1 * | 5/2007 | Bourdoncle et al. ......... 351/169 |

(Continued)

FOREIGN PATENT DOCUMENTS

EP    0 990 939    4/2000

(Continued)

OTHER PUBLICATIONS

Jalie, "Progressive Lenses Part 2, The New Generation", *Optometry Today / Optics Today*, pp. 35-45 (Jun. 17, 2005).

(Continued)

*Primary Examiner*—Ricky L Mack
*Assistant Examiner*—James R Greece
(74) *Attorney, Agent, or Firm*—Hensley Kim & Holzer LLC

(57) ABSTRACT

A method for the determination by optical optimization of a personalized progressive ophthalmic lens intended to be inserted into a frame chosen by a given wearer for whom a power addition has been prescribed in near vision, the method comprising the stages of:
 determining at least one parameter representing the frame chosen by the wearer;
 measuring parameters representing the wearer's head-eye behavior;
 weighting the parameters representing the wearer's head-eye behavior with the parameter representing the frame chosen by the wearer;
 determining power and resulting astigmatism defect targets for each direction of viewing under wearing conditions, the targets being associated with an individual merit function taking into account the weighted head-eye coordination parameters.

The method allows the design of the lens to be adapted to the size and the shape of the frame chosen.

4 Claims, 5 Drawing Sheets

FOREIGN PATENT DOCUMENTS

| | | |
|---|---|---|
| FR | 2 683 642 | 5/1993 |
| FR | 2 699 294 | 6/1994 |
| FR | 2 704 327 | 10/1994 |
| FR | 2 820 516 | 8/2002 |
| FR | 2 863 857 | 6/2005 |
| GB | 2 277 997 | 11/1994 |
| WO | WO 98/12590 | 3/1998 |
| WO | WO 01/88601 | 11/2001 |

OTHER PUBLICATIONS

European Search Report for Application No. EP 07 29 0227, dated May 22, 2007.
European Search Report for Application No. EP 07 29 0226, dated May 22, 2007.

* cited by examiner

METHOD FOR THE DETERMINATION OF A PROGRESSIVE OPHTHALMIC LENS

CROSS REFERENCE TO RELATED APPLICATION

Pursuant to U.S.C. §119, this application claims the benefit of French Patent Application 06 01 811, filed Mar. 1, 2006. The contents of the prior application is incorporated herein by reference in its entirety.

TECHNICAL FIELD

This invention relates to a method for the determination of a progressive ophthalmic lens; in particular a progressive lens personalized for a specific frame chosen by a given wearer.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and the position of the wearer's eyes relative to the frame.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327.

Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. Most lenses marketed are all-purpose lenses, in that they are adapted to the different needs of the wearers at the time.

A progressive multifocal lens can be defined by geometric characteristics on at least one of its aspherical surfaces. In order to characterize an aspherical surface, the parameters constituted by the minimum and maximum curvatures at each point are conventionally used, or more commonly their half-sum and their difference. This half-sum and this difference multiplied by a factor n−1, n being the refractive index of the lens material, are called mean sphere and cylinder.

Moreover, a progressive multifocal lens can also be defined by optical characteristics taking into account the situation of the wearer of the lenses. In fact, the laws of the optics of ray tracings provide that optical defects appear when the rays deviate from the central axis of any lens. Conventionally, the aberrations known as power defects and astigmatism defects are considered. These optical aberrations can be generically called obliquity defects of rays.

The obliquity defects of rays have already been clearly identified in the prior art and improvements have been proposed. For example, the document WO-A-98 12590 describes a method for determination by optimization of a set of progressive multifocal ophthalmic lenses. This document proposes defining the set of lenses by considering the optical characteristics of the lenses and in particular the wearer power and oblique astigmatism, under wearing conditions. The lens is optimized by ray tracing, using an ergorama associating a target object point with each direction of viewing under wearing conditions.

EP-A-0 990 939 also proposes to determine a lens by optimization taking into account the optical characteristics instead of the surface characteristics of the lens. For this purpose the characteristics of an average wearer are considered, in particular as regards the position of the lens in front of the wearer's eye in terms of curving contour, pantoscopic angle and lens-eye distance.

It has been found that each wearer has a different head-eye behaviour. Recently, it has therefore been sought to personalize progressive ophthalmic lenses in order to best satisfy the needs of each wearer.

The applicant markets, under the trade mark VARILUX IPSEO® a range of progressive lenses, which are defined as a function of the wearer's head-eye behaviour. This definition is based on the fact that any wearer, in order to look at different points at a given height in the object space, can move either his head, or his eyes and that the viewing strategy of a wearer is based on a combination of head and eye movements. The wearer's viewing strategy influences the perceived width of the fields on the lens. Thus, the more the wearer's lateral vision strategy involves a movement of the head, the narrower is the zone of the lens scanned by the wearer's vision. If the wearer moved only his head in order to look at different points at a given height of the object space, his vision would still pass through the same point of the lens. The product VARILUX IPSEO® therefore proposes different lenses, for the same ametropia-addition pair, as a function of the wearer's lateral vision strategy.

It has also been found that the size and the shape of the frame modifies the wearer's lens-eye behaviour. Therefore it has also been sought to optimize the progressive ophthalmic lens for the type of frame chosen.

For example, the patent U.S. Pat. No. 6,199,983 proposes to personalize a progressive lens as a function of the "lifestyle" of the wearer, for example taking into account the shape of the frame.

It is also proposed in the document U.S. Pat. No. 5,444,503 to take into account the shape of the frame in order to distribute the prismatic effects to the left and to the right of the lens in order to obtain an acceptable "thickness-weight" ratio and in order to disperse the aberrations towards the parts of the lens intended to be trimmed during cutting out.

Documents U.S. Pat. No. 6,655,802 and US-A-2004/0169297 propose to optimize a progressive lens as a function of the cornea-vertex distance measured for a given frame in order to determine an optimal progression length.

Nikon® markets under the trade mark Seemax® a unifocal lens optimized as a function of the size and the shape of the frame.

None of the known solutions makes it possible to optimize the lens in all of the wearer's vision field as a function of the frame chosen.

A need still exists therefore for a lens which better satisfies the specific needs of each individual wearer.

SUMMARY

Consequently, the invention proposes taking into account the shape and the size of the frame in determining the fields and the gradients of the power and of the astigmatism on the optimized lens. The method of the invention makes it possible to determine a progressive ophthalmic lens guaranteeing for the wearer an improved dynamic and peripheral vision whatever the type of frame chosen and its prescription. For example, a wearer who chooses a small frame will tend to move his head to a greater degree and his eyes to a lesser degree. In order to prevent pitching effects, it will therefore be sought to reduce the power and astigmatism gradients on the cut-out lens to the dimensions of this small frame. On the other hand, if the wearer chooses a large frame, he will tend to move his eyes to a greater degree and his head to a lesser degree. The pitching effects are therefore naturally minimized and instead it will be sought to clear the fields in order to enlarge the peripheral vision.

The invention more particularly proposes a method for the determination of a personalized progressive ophthalmic lens intended to be inserted into a frame chosen by a given wearer for whom a power addition has been prescribed in near vision, the method comprising the stages of:

- determining at least one parameter representing the frame chosen by the wearer;
- measuring parameters representing the wearer's head-eye behaviour;
- weighting the parameters representing the wearer's head-eye behaviour with the parameter representing the frame chosen by the wearer;
- determining an ergorama associating a point with each direction of viewing under wearing conditions;
- determining power and resulting astigmatism defect targets for each direction of viewing under wearing conditions, the targets being associated with an individual merit function taking account of the weighted head-eye coordination parameters;
- calculating the power required on the lens by successive iterations in order to obtain the target power defect and the target astigmatism defect for each direction of viewing.

According to one embodiment, the stage of determining the parameter representing the frame comprises the stages of:

- measuring the width of the cut-out lens;
- measuring the bridge width of the chosen frame;
- measuring the wearer's interpupillary distance;
- calculating a horizontal parameter taking account of the width of the cut-out lens, the bridge width and the interpupillary distance measured.

According to one embodiment, the stage of determining the parameter representing the frame comprises the stages of:

- calculating a standard horizontal parameter;
- determining a frame width coefficient;
- According to one embodiment, the stage of measuring parameters representing the wearer's head-eye behaviour comprises the stages of:
- calculating a gain value as the ratio of the head angle over the viewing angle for a fixed point of the ergorama;
- determining a stability coefficient as the standard deviation around the gain value.

The invention also relates to a personalized progressive ophthalmic lens optimized by the determination method according to the invention.

The invention also relates to a visual device comprising a frame chosen by a wearer and at least one lens according to the invention and a method for the correction of the vision of a presbyopic subject, comprising the provision to the subject or the wearing by the subject of a device according to the invention.

DESCRIPTION OF DRAWINGS

Other advantages and features of the invention will become apparent on reading the following description of the embodiments of the invention, given by way of example and with reference to the drawings which show.

DETAILED DESCRIPTION

Figure 2:
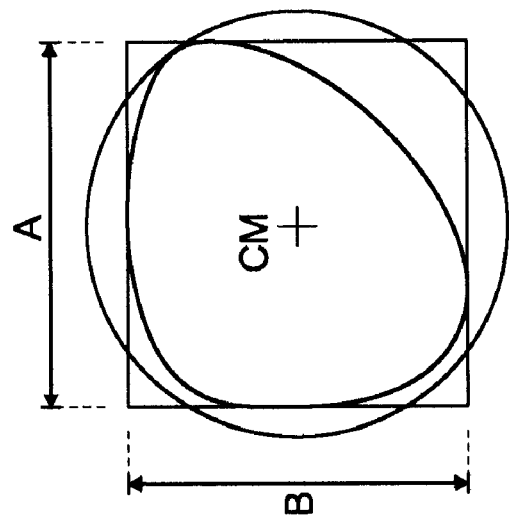
FIG. 2, a diagram of a lens before and after cutting out for insertion into a frame of FIG. 1.

The invention proposes a method for the determination of a progressive ophthalmic lens for a presbyopic wearer, i.e. for whom a power addition (Add) has been prescribed for near vision. The method of the invention makes it possible to determine a progressive ophthalmic lens guaranteeing for the wearer good accessibility to the near-vision zone and an improved dynamic vision in all of the vision field whatever the type of frame chosen and its prescription.

In a manner known per se, a progressive lens has a far-vision zone with a control point FV, a near-vision zone with a control point NV and an intermediate-vision zone. A principal progression meridian crosses these three zones. The meridian therefore has a power progression between the control point in far vision FV and the control point in near vision NV; this progression corresponds approximately to the value of the addition prescribed. A fitting cross CM is marked by a reference point on the complex surface and constitutes an aid for fitting the cut-out lens into the frame; this fitting cross CM makes it possible to locate on the lens the primary direction of viewing under wearing conditions. In this context, progression length PL refers to the vertical distance between the fitting cross CM and the point of the meridian in near vision NV at which the power progression reaches the prescribed power.

The progression length PL defines the accessibility to the powers necessary in near vision. In fact, the profile of the meridian represents the wearer power as a function of lowering the eyes in the eye sockets with a direction of viewing which is straight ahead. Thus, according to the value of the progression length, the wearer will have to lower his eyes more or less in order to be able to take full advantage of the near-vision zone. With a constant progression length, the near-vision zone can be substantially present on the cut-out lens depending on the size and the shape of the frame.

The present invention proposes taking into account the size and the shape of the frame in order to optimize a progressive ophthalmic lens and to afford optimal visual comfort for the wearer. The consideration of such frame parameters is now possible on an industrial scale thanks to the methods for direct machining of the complex surfaces constituting the progressive lenses.

The invention proposes to determine a progressive ophthalmic lens personalized for the frame chosen by the wearer.

For this purpose, at least one parameter representing the frame chosen by the wearer is measured as explained below with reference to FIGS. 1 and 2. The wearer's head-eye behaviour is then measured, for example with a device of the VisionPrint System™ type developed by the applicant. Head-eye coordination parameters, comprising a gain value GA and a stability coefficient ST, are determined. These parameters are detailed below. The parameters representing the wearer's head-eye behaviour are then weighted with the parameter representing the frame chosen by the wearer.

A personalized design can then be created for the lens with power and resulting astigmatism defect targets for each direction of viewing under wearing conditions. The targets are determined using an individual merit function taking into account the weighted head-eye coordination parameters. The power required at each point of the progressive lens is then calculated by successive iterations, by optical optimization using a starting lens, in order to obtain the target power defect and the target astigmatism defect.

The lens thus obtained has field widths and power and resulting astigmatism defect gradients particularly well suited to the wearer who has chosen his frame.

Figure 1:
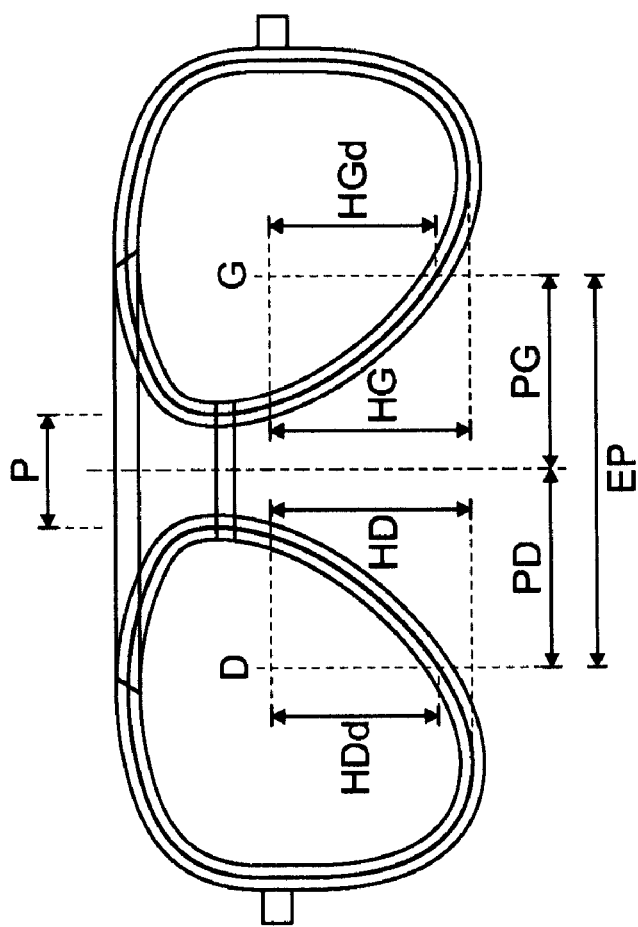
FIG. 1, a diagram of an ordinary frame.

FIG. 1 shows a diagram of a frame and FIG. 2 diagrammatically illustrates a lens before and after cutting out.

The wearer chooses a frame. The optician measures the physiological parameters of the wearer for the chosen frame. FIG. 1 shows a representation of a frame and the position of the right and left pupils of the wearer in the frame, which are respectively referenced D and G. The figure shows for the frame the contour of the lens in thick lines, and in thin lines the internal and external limits of the frame. An element, made of plastic or another material, the contour of which corresponds to the bottom of the groove of the frame, is called the template of the frame. The template is therefore the external shape that the lens must have once cut out in order to fit in the frame. The letter B designates the total height of the template determined with the Boxing system, i.e. according to the ISO8624 standard on systems for the measurement of lenses frames. This height corresponds to the height of a rectangle into which the lens fits once it is cut out. In the case of a drilled frame, without any template, it is the height B of the cut-out lens (FIG. 2) which is considered. An element connecting the right and left templates of the frame is called the bridge of the frame, referenced by letter P in FIG. 1. The bridge P can also be a rod connecting drilled right and left lenses.

Interpupillary distance EP refers to the distance between the two pupils of the wearer. For the fitting of progressive lenses, an optician measures the right interpupillary half-distance and the left interpupillary half-distance, which are referenced PD and PG. The left half-distance (respectively right) is the distance between the vertical axis of symmetry of the frame and the centre of the left pupil (respectively right). Right boxing height HD (respectively left boxing height HG) refers to the vertical distance between the right pupil (respectively left) and the lowest point of the right half-frame (respectively left height). For the fitting of progressive lenses, the optician then measures the DATUM heights referenced HDd and HGd in FIG. 1. These right and left reference heights are respectively the distances between the right or left pupil and the right or left intersection between a vertical line passing through the pupil and the frame in its lower part. The measurements of interpupillary distance and of height of the pupil relative to the frame are carried out for a given position of the wearer, namely for the wearer looking at infinity with his head straight.

The features of a given frame can be measured on the frame, using a device known per se. By way of example, U.S. Pat. No. 5,333,412 describes a device which makes it possible to measure in 3-dimensions, the shape of the bottom of the groove of the frame. The shape thus determined then makes it possible to calculate the height B. The features of a frame can also be given directly by the manufacturer according to the model chosen by the wearer.

Using the data thus defined, each lens is cut out such that the fitting cross CM is situated in the frame facing the pupil of the corresponding eye, when the wearer looks at infinity with his head straight. Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

FIG. 2 shows a representation of the contour of an ophthalmic lens, before and after cutting out. In the figure, the thin line corresponds to the contour of the lens before cutting out; in a standard manner, the lens can be obtained by molding and has a circular shape. The thick line corresponds to the contour of the template of the frame, which is also the contour of the lens after cutting out the lens. This cutting out of the lens allows the subsequent fitting of the lens in the frame.

FIG. 2 shows the total width A of the template of the frame and the total height B of this template, i.e. the width and the height of the rectangle into which the cut-out lens fits. As explained above, the positioning of the lens in the frame consists in determining the desired position of the lens in the frame, using notable points of the lens. For example, the fitting cross of the lens, the medium of micro-marks marked on the surface of the lens, or also the optical centre in the case of a unifocal lens can be used. In FIG. 2, the fitting cross is marked by the cross referenced CM. For a lens which does not have a rotational symmetry, it is also necessary to carry out an angular positioning of the lens in the frame. This angular positioning depends on the manufacturer's specifications, and in particular for progressive lenses on the behaviour of the principal progression meridian; in the progressive lenses of the applicant, the principal progression meridian is inclined on the temporal side towards the nose side, and the lens must be fitted in such a way that the micro-marks are horizontal. In the state of the art lenses have also been proposed having a straight principal progression meridian, which are inclined towards the nose side when fitting.

A given frame, chosen by a given wearer, can thus be characterized by a certain number of parameters representing its size and its shape. Notably, it is also possible to define a horizontal parameter taking into account the total width A of the template of the frame (or of the cut-out lens), the width of the bridge P and the interpupillary distance measured EP. For example it is possible to use as horizontal parameter A', the variable defined as follows:

$$A'=A+0.5*(P-EP).$$

This variable can be calculated for each eye:

$$A'd=A+0.5*P-PD$$

$$A'g=A+0.5*P-PG$$

In this context, standard parameters are defined as the average value of the horizontal and vertical parameters as defined above for a representative sample of frames and for the average of wearers. According to the definitions of the parameters given above, a standard horizontal parameter $A'_{av}$ would be defined as follows: $A'_{av}=A_{av}+0.5*(P_{av}-EP_{av})$.

With $A_{av}$, the average width of frame template, equal to 51.6 mm, this being calculated from 5600 prescriptions collected between November 2003 and April 2004 in Europe;

$P_{av}$, the average length of a bridge of a frame, equal to 18.4 mm, this being calculated from 5600 prescriptions collected between November 2003 and April 2004 in Europe;

$EP_{av}$, the average interpupillary distance, generally set at 62 mm.

Then a frame width coefficient γ is determined as the ratio of the measured horizontal parameter A' over the standard horizontal parameter $A'_{av}$. This coefficient γ can be determined for each lens using the variables A'd and A'g calculated for each eye.

In addition to a parameter representing the frame, parameters representing the wearer's head-eye behaviour are also measured. These parameters can be those measured in order to define the lenses sold under the trade mark VARILUX IPSEO®, namely a gain GA and a stability coefficient ST.

The gain GA is a parameter which gives the proportion of the head movement in the total viewing movement in order to reach a target. The gain GA can be defined as the ratio of the head angle over the viewing angle for a fixed point of the ergorama. The gain has a value comprised between 0.00 and 1.00. For example, a gain value of 0.31 indicates a behaviour with a preponderant movement of the eyes.

The stability coefficient ST is a parameter which indicates the stability of the behaviour, i.e. the standard deviation around the gain value. Most wearers are stable and the value of the coefficient ST is generally less than 0.15.

The method for the determination of a lens of the invention proposes to weight the values of the parameters representing the head-eye behaviour with the parameter representing the frame γ.

For example, the gain GA can be weighted as follows:

$$GA'=\text{MAX}[\text{MIN}[GA*(1-kg*(\gamma-1));1];0]$$

with $0 \leq g \leq 2$;

and the stability coefficient ST can be weighted as follows:

$$ST'=\text{MAX}[ST*(1+ks*(\gamma-1));0]$$

with $0 \leq ks \leq 2$.

Weighting of the parameters GA and ST is limited by the MIN and MAX of the above formulae. GA' is therefore comprised between 0 and 1 and ST is always greater than 0. Thus, if the coefficients ks=kg=0, the parameter representing the frame is not taken into account and the representative parameters measured for the head-eye behaviour of the wearer GA and ST are not changed; and if γ=1, the horizontal parameter A' representing the size of the wearer's frame is equal to the average horizontal parameter $A'_{av}$ and the parameters representing the wearer's head-eye behaviour GA and ST are unchanged.

Figure 3:
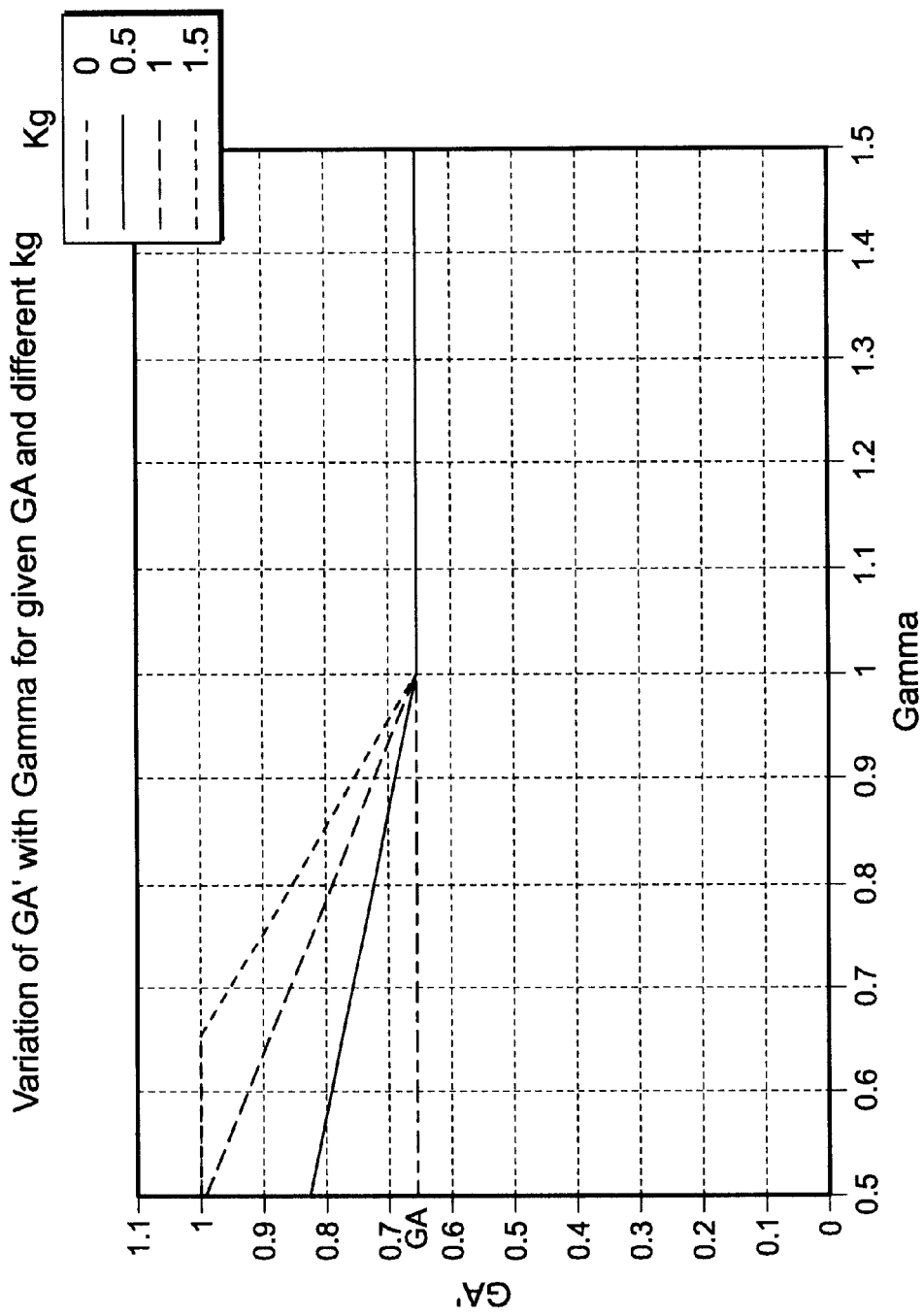
FIG. 3, a graph showing an example of the variation of the gain parameter for head-eye behaviour with the frame-width coefficient.
Figure 4:
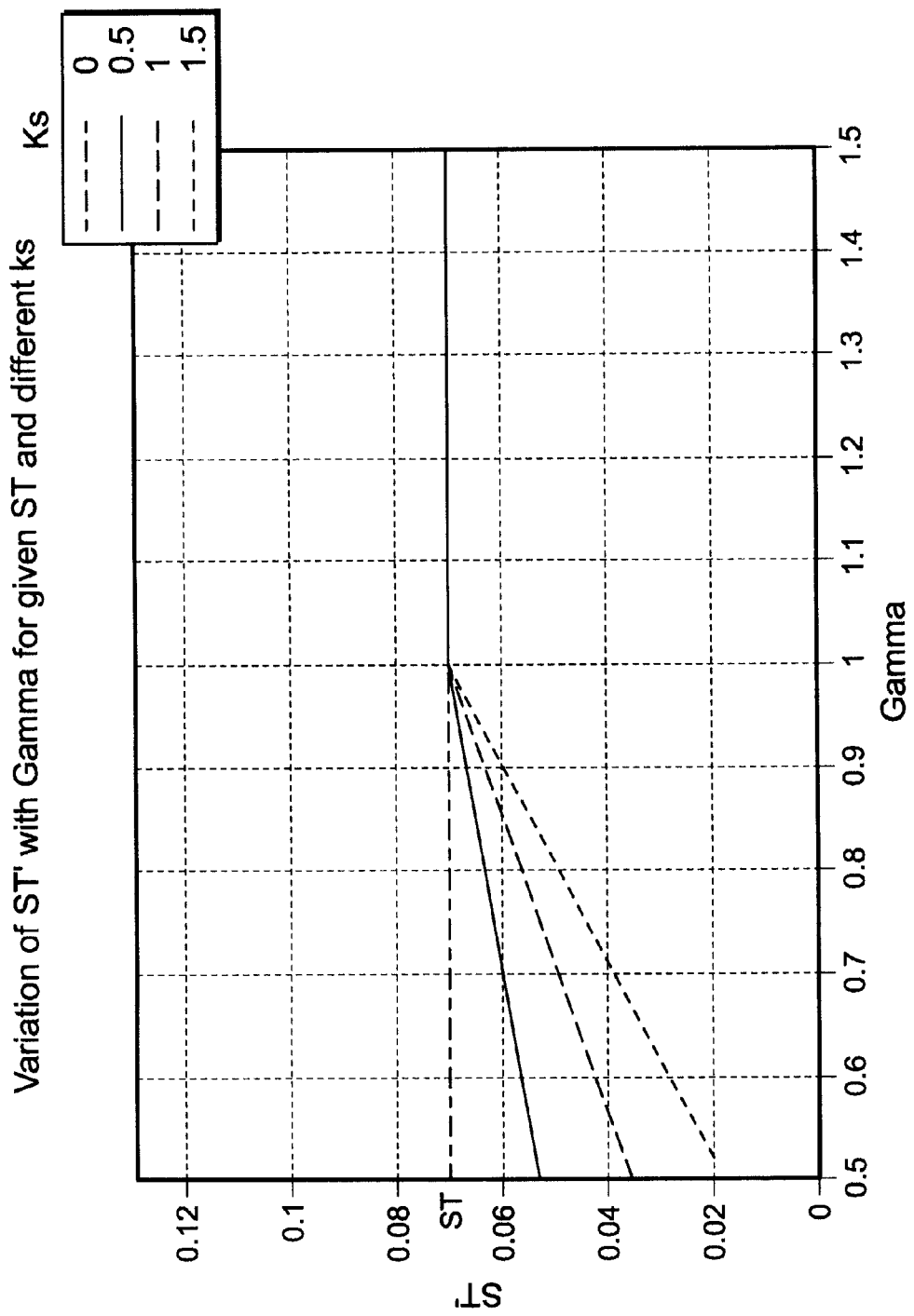
FIG. 4, a graph showing an example of the variation of the stability parameter for head-eye behaviour with the frame-width coefficient.

In one embodiment, illustrated in FIGS. 3 and 4, when γ>1, coefficients kg and ks are set to zero, then GA'=GA and ST'=ST. When γ>1, the frame presents no additional constraint for the wearer since it is larger than the reference frame. In other words, in a large frame, there is an optimal design given by only the measurements of the parameters representing the wearer's head-eye behaviour GA and ST. When kg=ks=0, the choice is made to not take the size of the frame into account.

FIG. 3 shows that the gain parameter GA' increases when the frame is smaller than an average reference frame (γ<1) and FIG. 4 shows that the stability parameter ST' reduces when the frame is smaller than an average reference frame. For a frame which is smaller than average, the parameters GA'>GA and ST'<ST are used in order to determine the power and astigmatism targets in order to optimize the progressive ophthalmic lens. This consideration of the frame parameter improves the representation of the lateral vision strategy of the wearer.

Figure 5B:
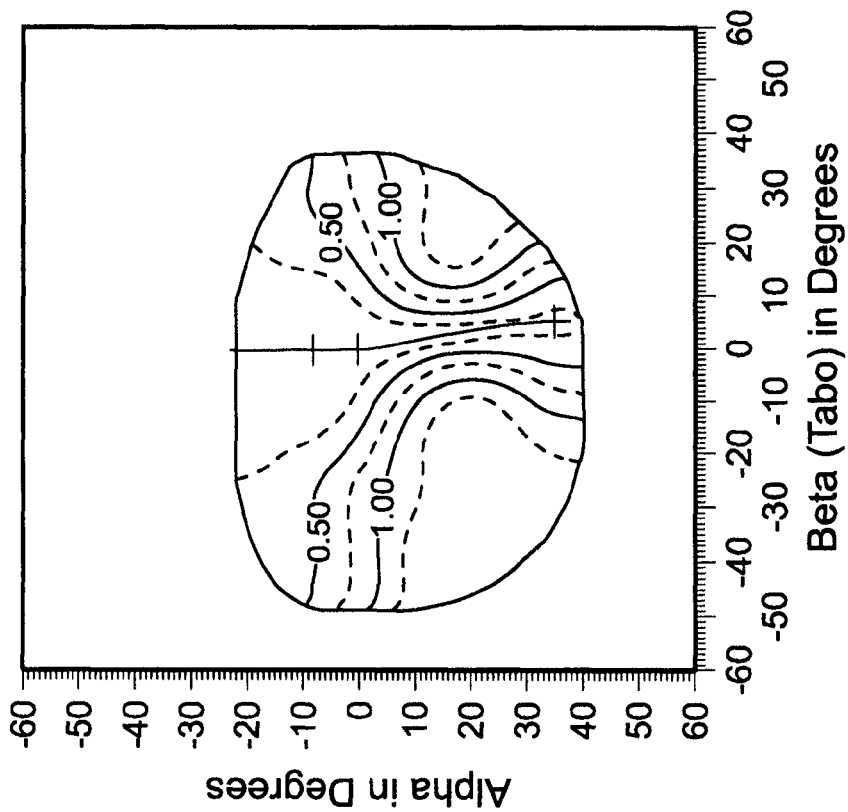
FIGS. 5*a* and 5*b*, maps of resulting astigmatism for a lens of the prior art and for a lens according to a first embodiment of the invention respectively.
Figure 5A:
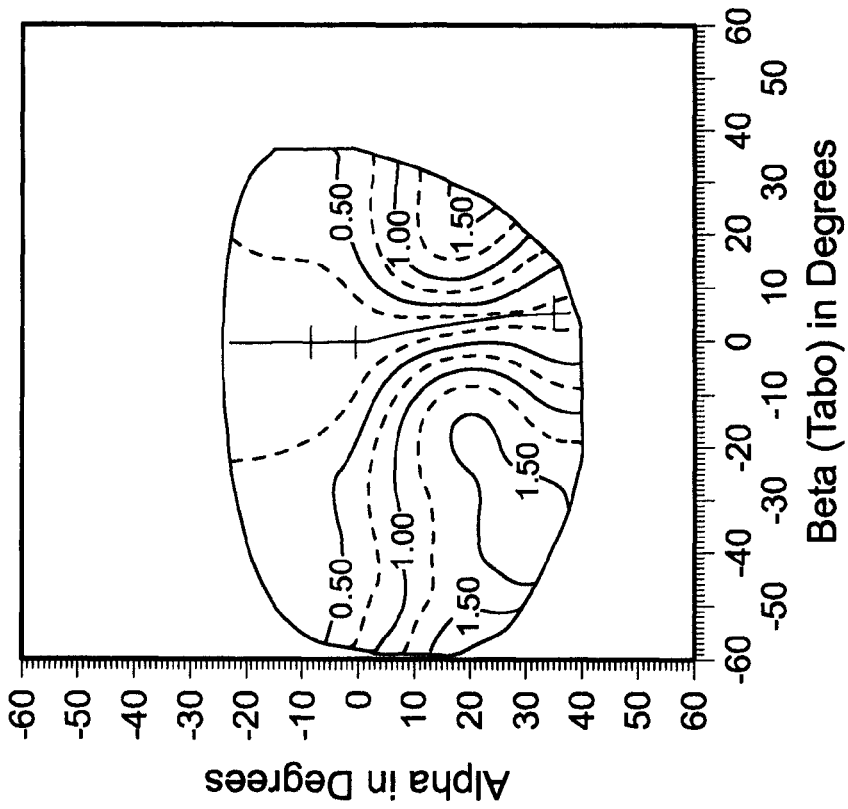

FIGS. 5a and 5b show another embodiment of a progressive ophthalmic lens determined by the method of the invention. FIG. 5a shows an optical output under wearing conditions of a lens having a distribution of resulting astigmatism targets determined using the GA and ST values measured for the wearer and for an average frame. FIG. 5b shows an optical output under wearing conditions of a lens specifically suited to the choice of a frame with a small size or with a small width. The parameter representing the frame γ is then less than 1 and the weighted head-eye coordination parameters GA' and ST' are different from those for a standard frame for the same wearer (GA increases and ST is reduced). The distribution of the resulting astigmatism targets on the lens of FIG. 5b is determined using a merit function taking into account the weighted head-eye coordination parameters GA' and ST'. Thus, if the wearer chooses a frame with a small size or with a small width (FIG. 5b), the merit function will impose gentler gradients and will allow fields which are more closed in order to limit the pitching effects.

Figure 6B:
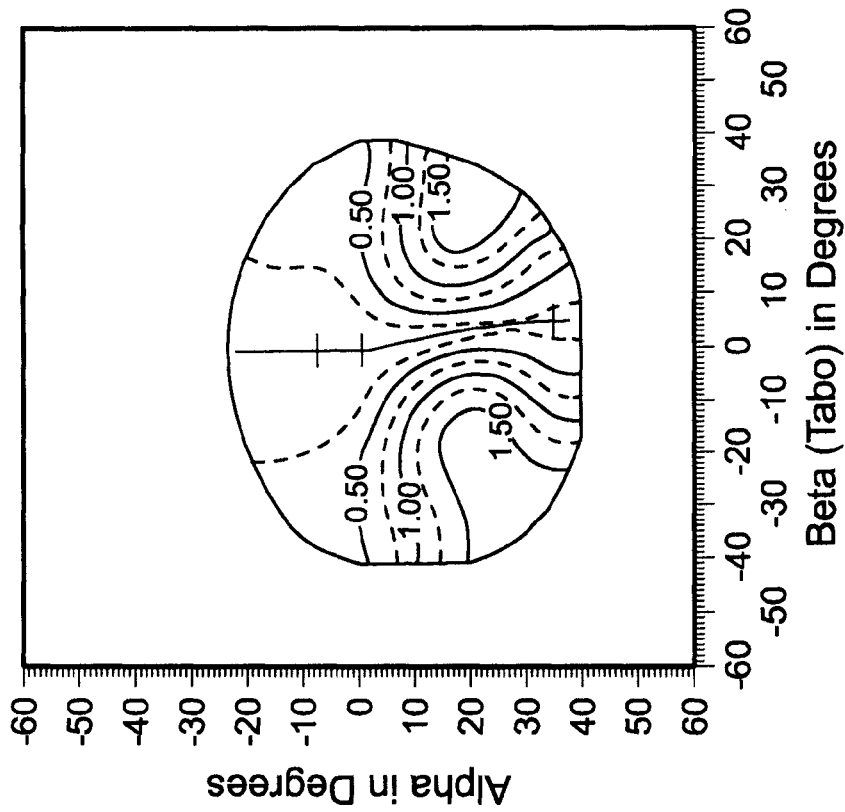
FIGS. 6*a* and 6*b*, maps of resulting astigmatism for a lens of the prior art and for a lens according to a second embodiment of the invention respectively.
Figure 6A:
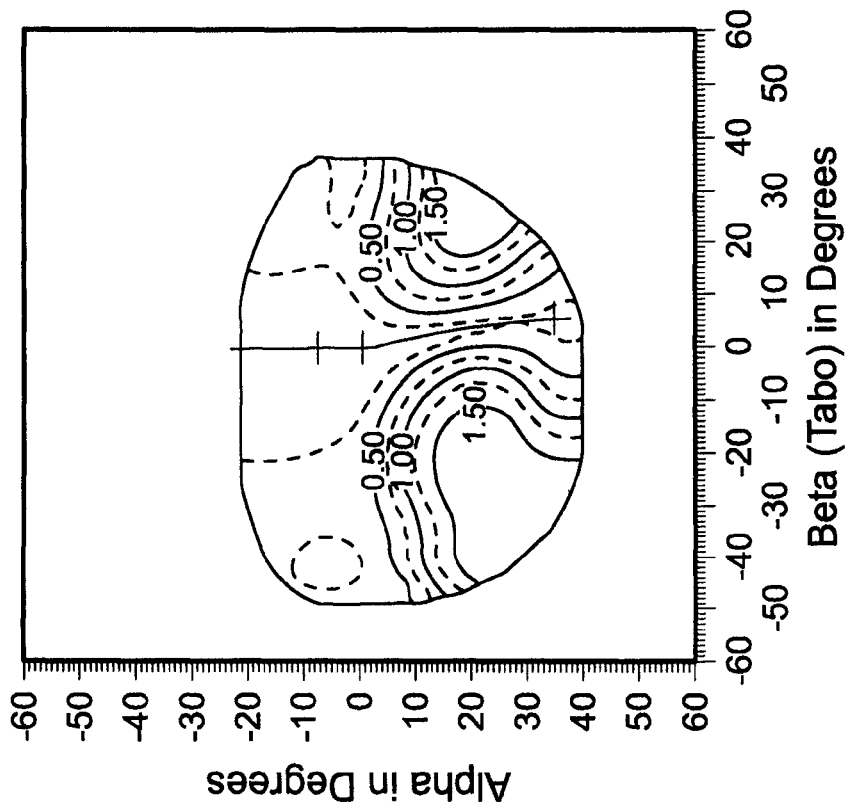

FIGS. 6a and 6b show another embodiment of a progressive ophthalmic lens determined by the method of the invention. FIG. 6a shows an optical output under wearing conditions of a lens having a distribution of resulting astigmatism targets determined using the GA and ST values measured for the wearer and for an average frame and FIG. 6b shows an optical output under wearing conditions of a lens specifically suited to the choice of a frame with a small width. The parameters of GA, ST, A', $A'_{av}$ and the frame shape change compared to the preceding example (FIG. 5a). The parameter representing the frame is also less than 1 and the weighted head-eye coordination parameters GA' and ST' are different to those for a standard frame for the same wearer (GA increases and ST is reduced). The distribution of the resulting astigmatism targets on the lens of FIG. 6b is then determined using a merit function taking account of the weighted head-eye coordination parameters GA' and ST'. Thus, if the wearer chooses a frame with a small width (FIG. 6b), the merit function will impose gentler gradients and will allow fields which are more closed in order to limit the pitching effects.

Although only the resulting astigmatism maps are illustrated, it is understood that the method of the invention also determines a personalized distribution of the power defect targets at the same time as the personalized distribution of the resulting astigmatism. It is also understood that the method of the invention allows other embodiments than those illustrated, for example a two-dimensional compression.

The method of the invention therefore makes it possible to determine a progressive ophthalmic lens by optical optimization using the distribution of the targets calculated as a function of the frame chosen by the wearer. The power required at each point of the lens can then be calculated by optical optimization under wearing conditions, by successive iterations in order to obtain the target power defect and the target astigmatism defect for each direction of viewing. The optical optimization can be carried out using a starting lens having any design, for example VARILUX COMFORT® or VARILUX PHYSIO®.

The lens according to the invention, thus obtained, therefore better satisfies the needs of the wearer and provides him with better visual comfort.

What is claimed is:

1. Method the determination of a personalized progressive ophthalmic lens intended to be inserted into a frame chosen by a given wearer for whom a power addition has been prescribed in near vision, the method comprising the stages of:
   determining at least one parameter representing the frame chosen by the wearer, wherein determining the parameter includes:
      measuring the width (A) of the cut-out lens,
      measuring the width of the bridge (P) of the chosen frame,
      measuring the wearer's interpupillary distance (Ep), and
      calculating a horizontal parameter (A') taking into account the width of the but-out lens, the bridge width and the interpupillary distance measured;
   measuring parameters representing the wearer's head-eye behaviour;
   weighting the parameters representing the wearer's head-eye behaviour with the parameter representing the frame chosen by the wearer;
   determining an ergorama associating a point with each direction of viewing under wearing conditions;
   determination of power and resulting astigmatism defect targets for each direction of viewing under wearing conditions, the targets being associated with an individual merit function taking account of the weighted head-eye coordination parameters;
   calculating the power required on the lens by successive iterations in order to obtain the target power defect and the target astigmatism defect for each direction of viewing.

2. The method of claim 1, in which the stage of determining the parameter representing the frame comprises the stages of: calculating a standard horizontal parameter ($A'_{av}$); determining a coefficient ($\gamma$) of the width of the frame ($A'/A'_{av}$).

3. The method of claim 1, in which the stage of measuring parameters representing the wearer's head-eye behaviour comprises the stages of:
   calculating a gain value (GA) as the ratio of the head angle over the viewing angle for a fixed point of the ergorama;
   determining a stability coefficient (ST) as the standard deviation around the gain value.

4. A personalized progressive ophthalmic lens optimized by the determination method of claim 1.

* * * * *